United States Patent
Fan

[19]

[11] Patent Number: 5,779,846
[45] Date of Patent: Jul. 14, 1998

[54] MACHINE FOR EMBEDDING COPPER NUTS IN A WORKPIECE

[76] Inventor: Kan-Tsang Fan, No. 38, Alley 41, Lane 116, Chun-Ying St., Shulin Town, Taipei County, Taiwan

[21] Appl. No.: 823,125

[22] Filed: Mar. 25, 1997

[51] Int. Cl.$^6$ ................................................. B32B 31/00
[52] U.S. Cl. ........................ 156/366; 156/298; 156/561; 156/562; 156/583.1
[58] Field of Search ........................... 156/297, 298, 156/359, 366, 367, 368, 538, 539, 556, 559, 560, 561, 562, 580, 581, 583.1

[56] References Cited

U.S. PATENT DOCUMENTS

| | | | |
|---|---|---|---|
| 3,404,056 | 10/1968 | Baldwin | 156/298 X |
| 3,878,026 | 4/1975 | Snyder et al. | 156/552 |
| 4,127,432 | 11/1978 | Kuwano et al. | 156/297 |
| 4,312,077 | 1/1982 | Petersson | 2/265 |

*Primary Examiner*—James Sells
*Attorney, Agent, or Firm*—Morton J. Rosenberg; David I. Klein; Jun Y. Lee

[57] ABSTRACT

A machine for embedding copper nuts in pasted holes of a workpiece, including a machine base holding two horizontal sliding rails and four upright guide rods, a mold carrier reciprocated along the sliding rails, a mold carried on the mold carrier and having upright heating elements for holding and heating copper nuts, a slotted workpiece carrier reciprocated along the upright guide rods, a holding down plate moved along the upright guide rods and controlled to hold down the workpiece on the slotted workpiece carrier, a first air cylinder controlled to move the mold carrier and the mold into the working position, a second air cylinder controlled to lower the workpiece, permitting pasted mounting holes of the workpiece to be respectively forced into engagement with heated copper nuts on the heating elements of the mold, and two third air cylinders controlled to move the slotted workpiece carrier relative to the holding down plate for loading/unloading of the workpiece.

1 Claim, 8 Drawing Sheets

5,779,846

MACHINE FOR EMBEDDING COPPER NUTS IN A WORKPIECE

BACKGROUND OF THE INVENTION

The present invention relates to a machine for embedding copper nuts in pasted mounting holes of a workpiece.

FIG. 5 shows a machine for embedding copper nuts in pasted mounting holes of a workpiece according to the prior art. This machine comprises a machine base 4, a rack 41 raised from the machine base 4, an air cylinder 42 vertically mounted on the rack 41 at the top, a mold 43 moved up and down within the rack 41 by the air cylinder 42 and having a plurality of downward heating elements 44, and a work table 45 at the top side of the machine base 4 below the mold 43. When the workpiece 3 is put on the work table 45, copper nuts 32 are respectively inserted into pasted mounting holes 31 in the workpiece 3, and then the mold 43 is lowered to attach the heating elements 44 to the copper nuts 32, permitting the copper nuts 32 to be heated (see FIG. 5A). When the heating elements 44 are respectively attached to the copper nuts 32 in the pasted mounting holes 31 and controlled to heat the copper nuts 32, the top side of each copper nut 32 is quickly heated, causing the nearby soldering paste to be firstly melted, and a recessed portion 33 may exist around the outer end of each embedded copper nut 32. Referring to FIG. 5B, when the heating element 44 is attached to the corresponding copper nut 32, the corresponding copper nut 32 may be forced to tilt. Furthermore, because the workpiece 3 is simply put on the work table 45 and not secured in place by fastening means, it may be forced to vibrate, causing the copper nuts 32 to escape out of the pasted mounting holes 31.

SUMMARY OF THE INVENTION

The present invention provides a machine for embedding copper nuts in a workpiece which eliminates the aforesaid problems. According to the preferred embodiment of the present invention, the machine comprises a machine base holding two horizontal sliding rails and four upright guide rods, a mold carrier reciprocated along the sliding rails, a mold carried on the mold carrier and having upright heating elements for holding and heating copper nuts, a slotted workpiece carrier reciprocated along the upright guide rods, a holding down plate moved along the upright guide rods and controlled to hold down the workpiece on the slotted workpiece carrier, a first air cylinder controlled to move the mold carrier and the mold into the working position, a second air cylinder controlled to lower the workpiece, permitting pasted mounting holes of the workpiece to be respectively forced into engagement with heated copper nuts on the heating elements of the mold, and two third air cylinders controlled to move the slotted workpiece carrier relative to the holding down plate for loading/unloading of the workpiece.

DETAILED DESCRIPTION OF THE PREFERRED EMBODIMENT

Figures 1, 1A:
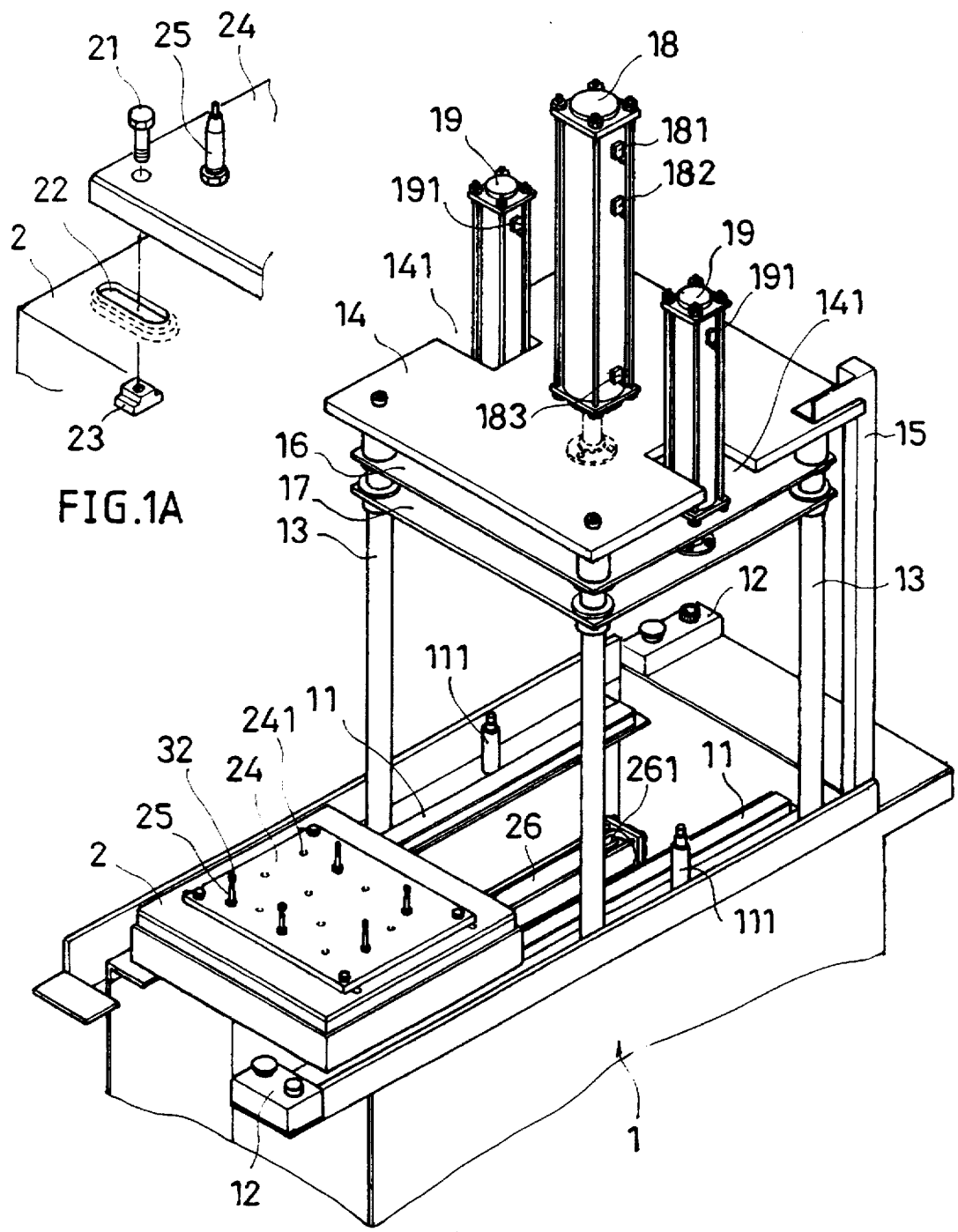
FIG. 1 is an elevational view of a machine for embedding copper nuts in a workpiece according to the present invention.
FIG. 1A is an exploded view of a part of the present invention, showing the mounting structure between the mold and the mold carrier.
Figure 2:
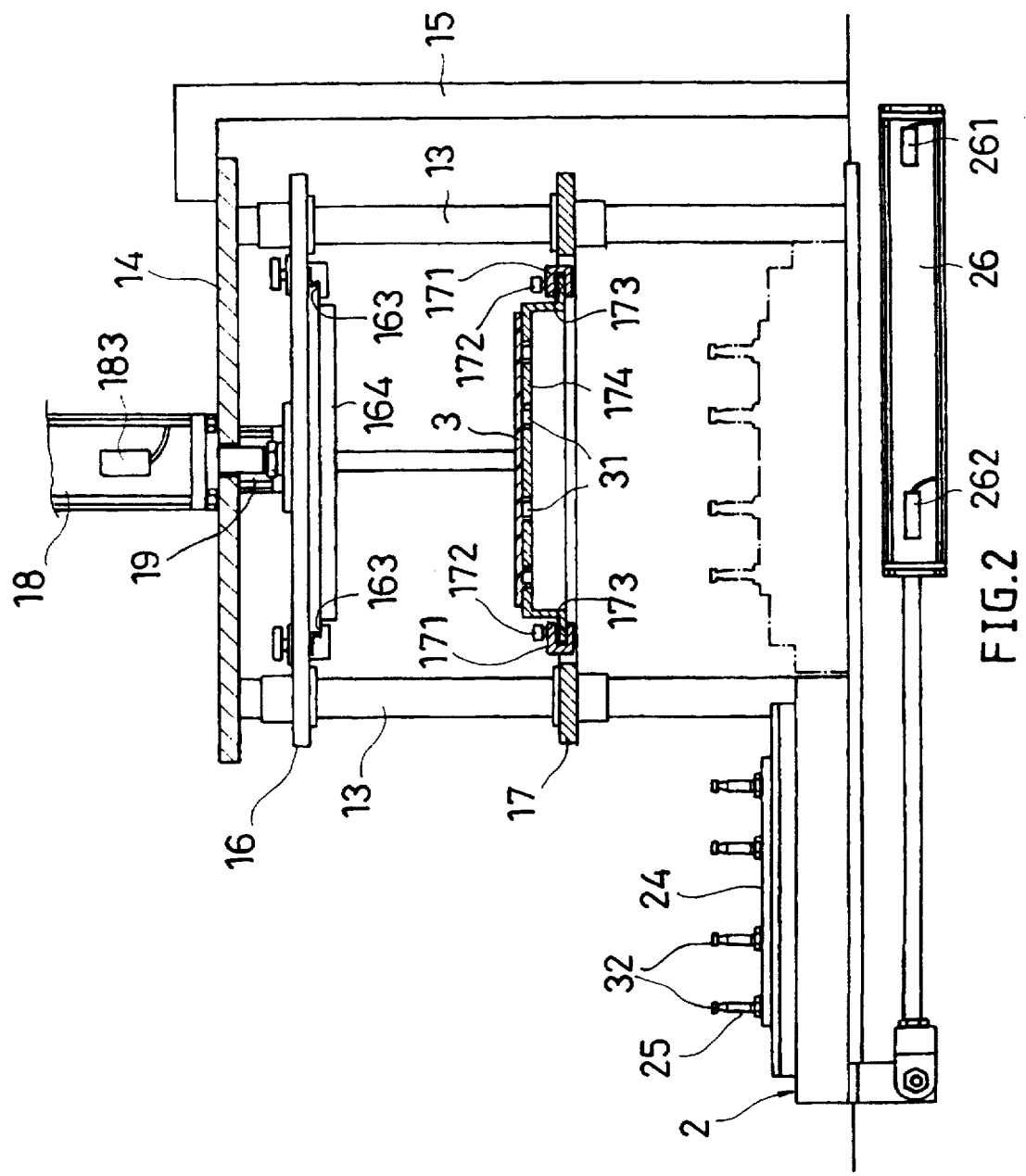
FIG. 2 is a side view of the machine shown in FIG. 1.

Referring to FIGS. 1, 1A and 2, a machine for embedding copper nuts in a workpiece in accordance with the present invention comprises a machine base 1, two sliding rails 11 bilaterally and longitudinally disposed in horizontal at the recessed top side of the machine base 1, a mold carrier 2 moved on the sliding rails 11, a horizontal air cylinder 26 mounted inside the machine base 1 at the bottom and controlled to reciprocate the mold carrier 2 along the sliding rails 11, four upright guide rods 13 raised from the top in four corners near one end, a top plate 14 fixedly mounted on the upright guide rods 13 at the top, a slotted workpiece carrier 17 mounted on the upright guide rods 13 below the top plate 14 and moved up and down along the upright guide rods 13, a holding down plate 16 mounted on the upright guide rods 13 and spaced between the top plate 14 and the workpiece carrier 17 and moved up and down along the upright guide rods 13, a main air cylinder 18 vertically mounted on the top plate 14 and controlled to move the holding down plate 16 and the workpiece carrier 17 synchronously up and down along the upright guide rods 13, two auxiliary air cylinders 19 vertically mounted on the holding down plate 16 and controlled to move the workpiece carrier 17 up and down along the upright guide rods 13 relative to the holding down plate 16, and two short stop rods 111 bilaterally raised from the top below the workpiece carrier 17 and adapted for limiting the down stroke of the workpiece carrier 17. The top plate 14 has two opposite side openings 141 through which the auxiliary air cylinders 19 pass. Two control panels 12 are diagonally mounted on the machine base 1 at its two opposite ends. Through the control panels 12, the machine can be turned on/off. A plurality of solenoid switches 181;182;183;191;261;282 are respectively mounted on the air cylinders 18;19;28 for controlling their operation. The mold carrier 2 has an elongated mounting slot 22 at each of its four corners. A mold 24 is fastened to the four mounting slots 22 of the mold carrier 2 by screws 21 and nuts 23, having a plurality of through holes 241. A plurality of heating elements 25 are respectively mounted in the through holes 241 of the mold 24, and adapted for heating a respective copper nut carried thereon. Further, a hollow frame 15 is installed in the machine base 1 and connected to the top plate 14. Through the hollow frame 15, electric wires pass.

Figure 3A:
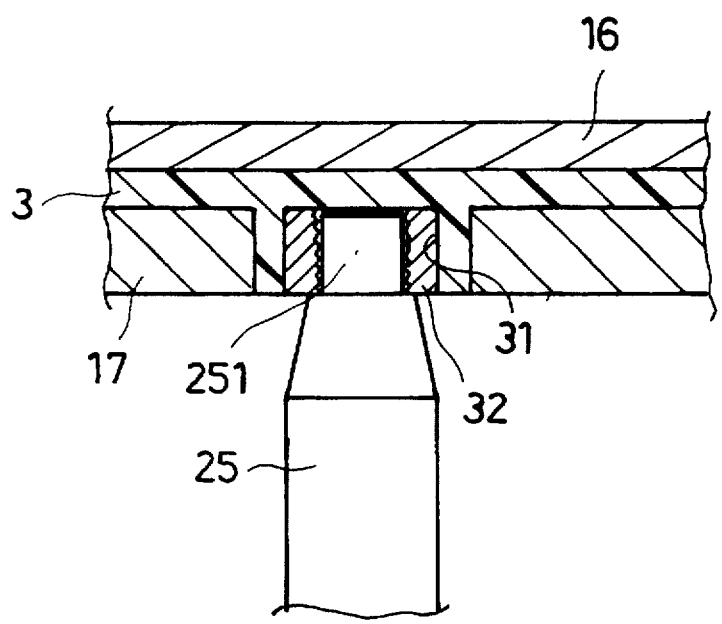
FIG. 3A is a schematic drawing showing a copper nut carried on a heating element and forced into a pasted mounting hole of a workpiece according to the present invention.
Figure 3:
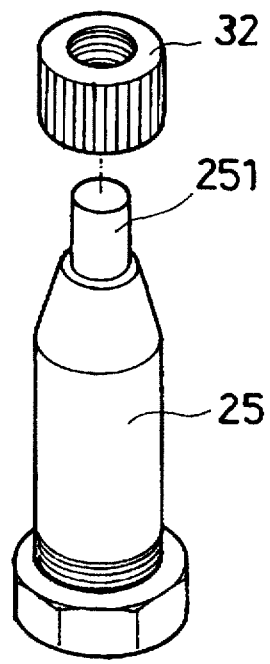
FIG. 3 is an elevational view in an enlarged scale of a heating element and a copper nut according to the present invention.

Referring to FIGS. 3 and 3-1, and FIG. 2 again, when the copper nuts 32 to be embedded are respectively mounted on the cylindrical top heating tip 251 of each heating element 25, the heating elements 25 of the mold 24 are turned on to heat the copper nuts 32, so that the heated copper nuts 32 can be accurately embedded in respective pasted holes 31 in the workpiece 3 retained between the workpiece carrier 17 and the holding down plate 16, and the installation time of the copper nuts 32 can be greatly shortened.

Figures 4, 4A:
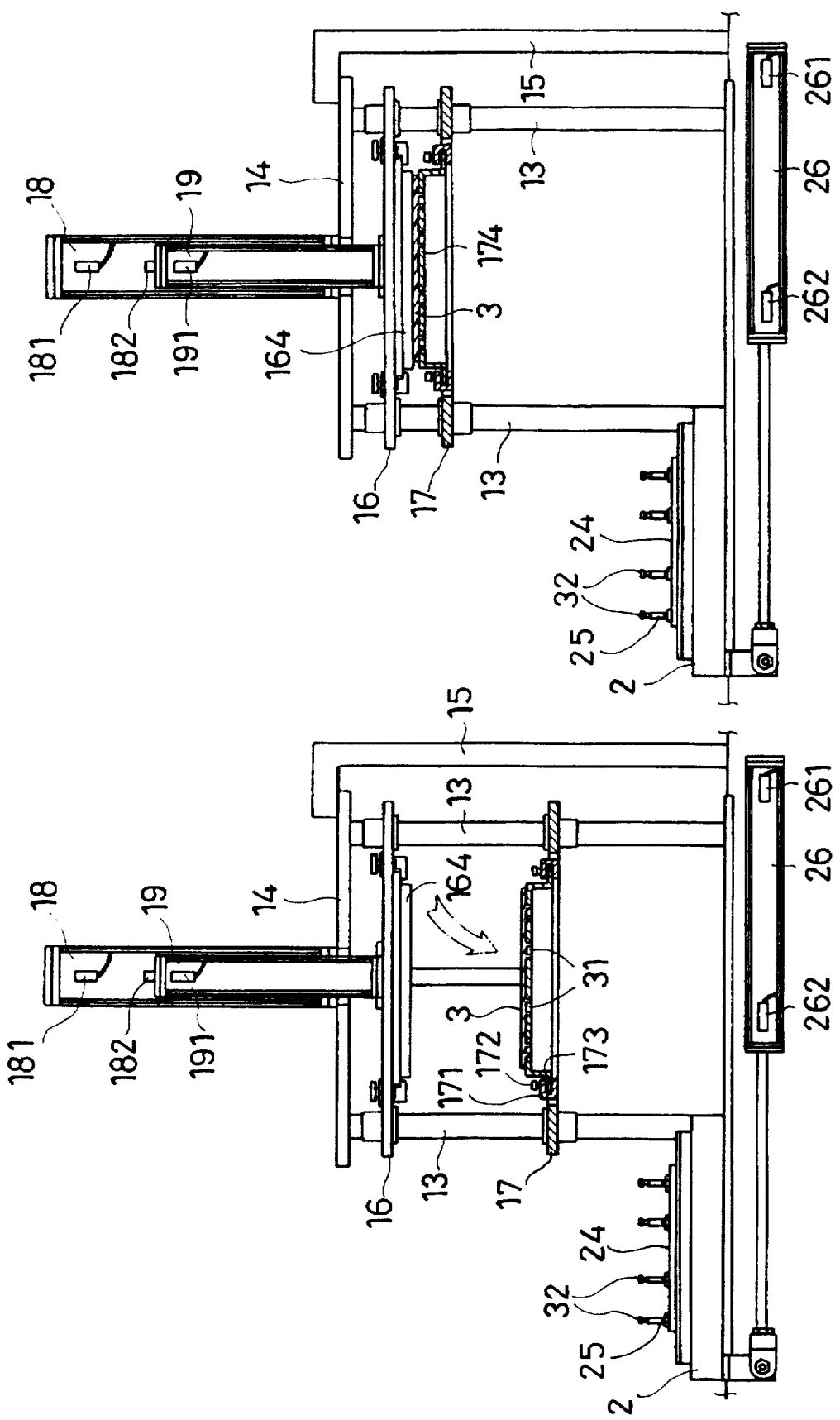
FIG. 4 is a sectional side view of the present invention, showing the slotted workpiece carrier lowered, a workpiece put on the slotted workpiece carrier.
FIG. 4A is another sectional side view of the present invention, showing the slotted workpiece carrier lifted, the workpiece retained in between the slotted workpiece carrier and the holding down plate.
Figure 4C:
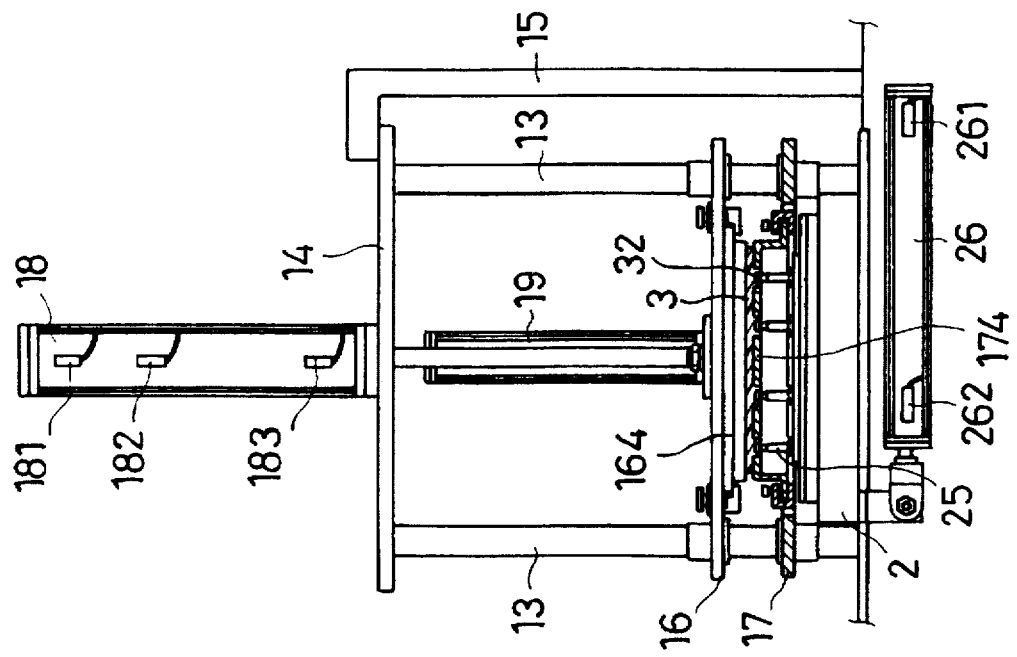
FIG. 4C is similar to FIG. 4B but showing the workpiece lowered, the copper nuts embedded in the workpiece.
Figure 4B:
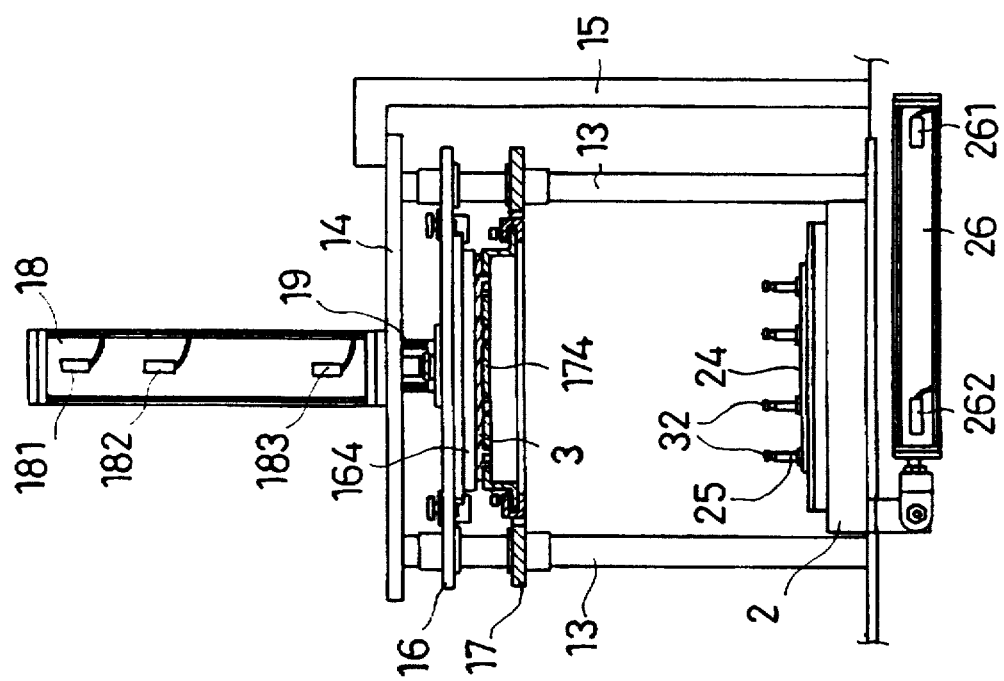
FIG. 4B is similar to FIG. 4A but showing the mold carrier and the mold moved to below the slotted workpiece carrier.
Figure 4D:
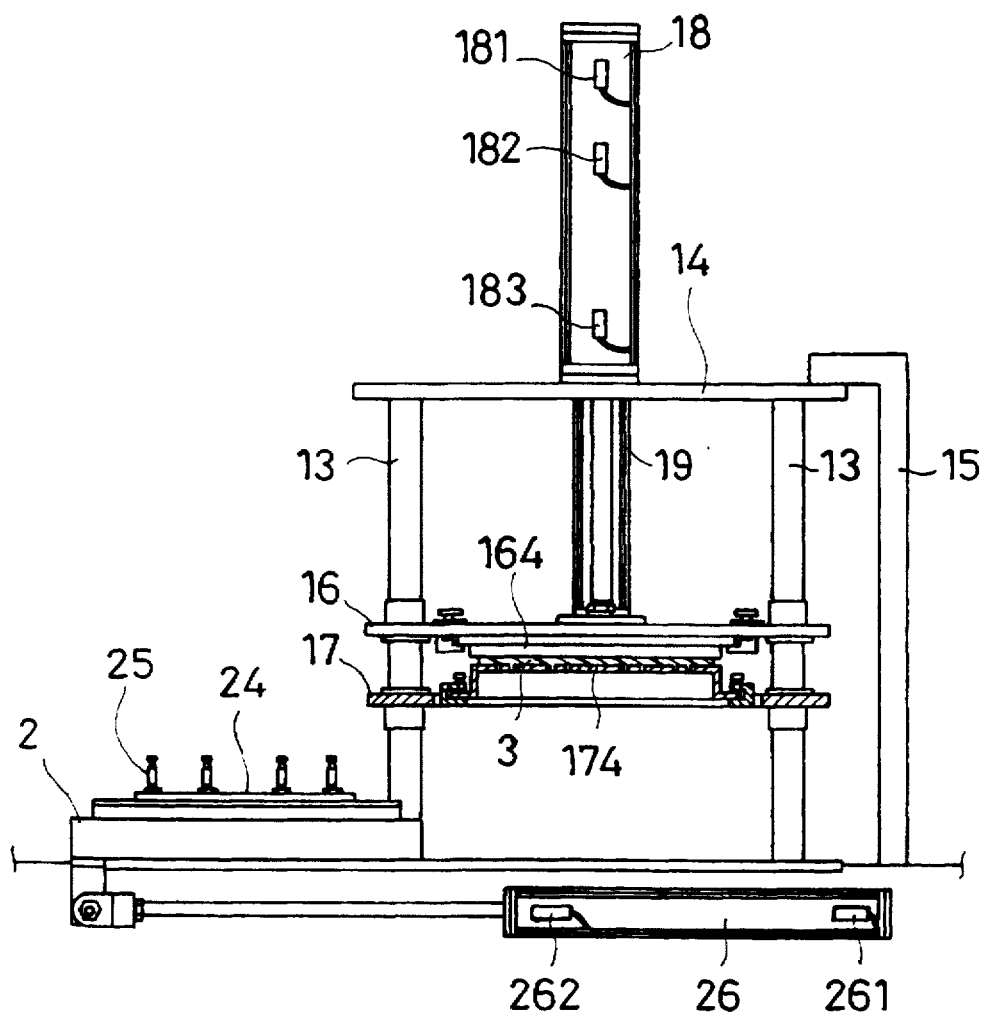
FIG. 4D is similar to FIG. 4C but showing the workpiece lifted, the mold carrier moved out of the processing position.
Figure 5:
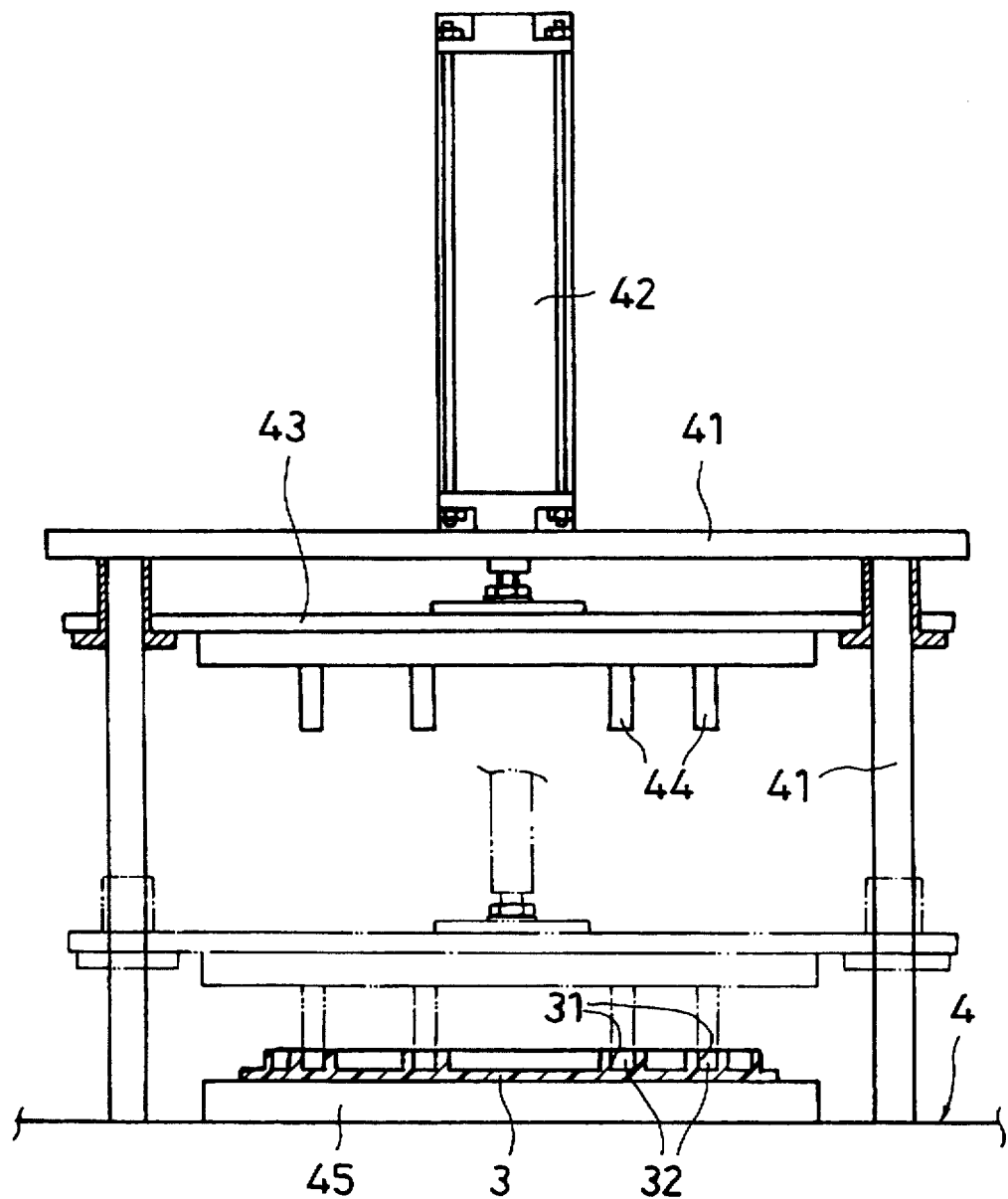
FIG. 5 is a side plain view of a machine for embedding copper nuts in a workpiece according to the prior art.
Figure 5A:
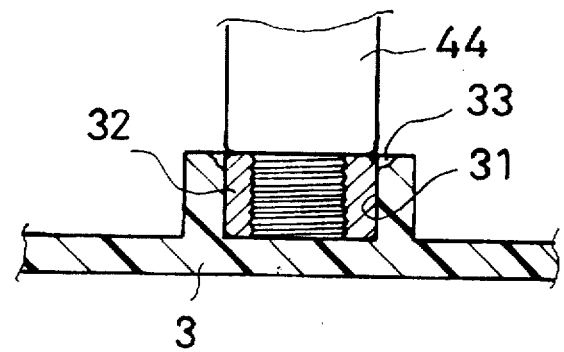
FIG. 5A is a sectional view showing the heating element attached to the copper nut in the pasted mounting hole of the workpiece, the soldering paste melted, and a recessed portion formed around the copper nut within the pasted mounting hole according to the prior art.
Figure 5B:
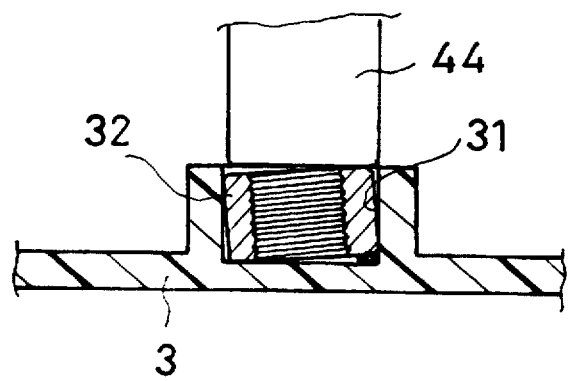
FIG. 5B is a sectional view showing the copper nut tilted in the pasted mounting hole of the workpiece according to the prior art.

Referring to FIGS. from 4 to 4D and FIG. 2 again, when the copper nuts 32 are respectively mounted on the top heating tips 251 of the heating elements 25 and heated, the workpiece 3 is put on the workpiece carrier 17 and then fixed in place by sliding clamps 171 (the sliding clamps 171 are moved on the workpiece carrier 17 and fixed in place by a respective tightening up screw 172, see FIGS. 2 and 4), and then the auxiliary air cylinders 19 are controlled through the control panels 12 to lift the workpiece carrier 17 toward the holding down plate 16, permitting the workpiece 3 to be firmly retained in between the workpiece carrier 17 and the holding down plate 16 (see FIG. 4A). When the workpiece 3 is firmly retained in between the workpiece carrier 17 and the holding down plate 16, the solenoid switches 191 of the auxiliary air cylinders 19 are triggered to turn on the horizontal air cylinder 26, causing it to move the mold carrier 2 and the mold 24 rightwards along the sliding rails 11. When the mold carrier 2 is moved into the processing position right below the workpiece carrier 17, the solenoid switch 261 is triggered to stop the horizontal air cylinder 26 and to turn on the main air cylinder 18, enabling the mold carrier 2 to be firmly retained in the processing position (see FIG. 4B), and causing the main air cylinder 18 to lower the holding down plate 16, the workpiece 3 and the workpiece carrier 17. When the main air cylinder 18 is lowered to the lower limit, the bottom solenoid switch 183 is triggered to stop the main air cylinder 18, the pasted mounting holes 31 of the workpiece 3 are respectively forced into engagement with the copper nuts 32 carried on the heating tips 251 of the heating elements 25 of the mold 24 (see FIG. 4C), and at the same time a timer is triggered to start counting time. When a predetermined length of time is up, the timer gives a signal to start the main air cylinder 18, causing it to lift the workpiece carrier 17, the workpiece 3 and the holding down plate 16 (see FIG. 4D). During the up stroke of the main air cylinder 18, the solenoid switches 181;182 are triggered one after another. When the intermediate solenoid switch 182 of the main air cylinder 18 is triggered, the horizontal air cylinder 26 is driven to move the mold carrier 2 leftwards along the sliding rails 11, and therefore the mold carrier 2 is returned to its original position. When the top solenoid switch 181 of the main air cylinder 18 is triggered, the auxiliary air cylinders 19 are driven to lower the workpiece carrier 17 from the holding down plate 16, and the workpiece 3 with the embedded copper nuts 32 can then be taken out of the workpiece 17.

While only one embodiment of the present invention has been shown and described, it will be understood that various modifications and changes could be made thereunto without departing from the spirit and scope of the invention disclosed.

What the invention claimed is:

1. A machine for embedding copper nuts in pasted holes of a workpiece, comprising:

- a machine base, said machine base comprising two longitudinal sliding rails bilaterally disposed at a top side thereof, four upright guide rods raised from its top side at one end of said longitudinal sliding rails, and a top plate fixedly mounted on said upright guide rods;
- a slotted workpiece carrier moved up and down along said upright guide rods of said machine base below said top plate and adapted for holding the workpiece to be processed;
- a holding down plate moved up and down along said upright guide rods of said machine base between said top plate and said slotted workpiece carrier and adapted for holding down the workpiece on said slotted workpiece carrier;
- stop means mounted on said machine base and adapted to limit the down stroke of said slotted workpiece carrier;
- a mold carrier moved along the longitudinal sliding rails between two opposite ends thereof;
- a mold mounted on said mold carrier and having a plurality of heating elements controlled to heat copper nuts carried thereon, permitting heated copper nuts to be inserted through said slotted workpiece carrier and embedded into respective pasted mounting holes in the workpiece retained in between said workpiece carrier and said holding down plate when said mold carrier is moved along said longitudinal sliding rails of said machine base to one end below said slotted workpiece carrier and said workpiece carrier with said holding down plate are lowered;
- a first air cylinder mounted in said machine base and controlled to reciprocate said mold carrier along said longitudinal sliding rails of said machine base;
- a second air cylinder mounted on said top plate of said machine base and controlled to reciprocate said slotted workpiece carrier and said holding down plate along said upright guide rods of said machine base;
- two third air cylinders respectively mounted on said holding down plate and controlled to reciprocate said slotted workpiece carrier along said upright guide rods of said machine base relative to said holding down plate; and
- two control panels diagonally mounted on two opposite ends of said machine base and adapted for controlling the operation of the apparatus, and adapted for controlling the operation of said first air cylinder, said second air cylinder and said third air cylinders through solenoid switch means installed thereon.

* * * * *